United States Patent Office 3,512,395
Patented May 19, 1970

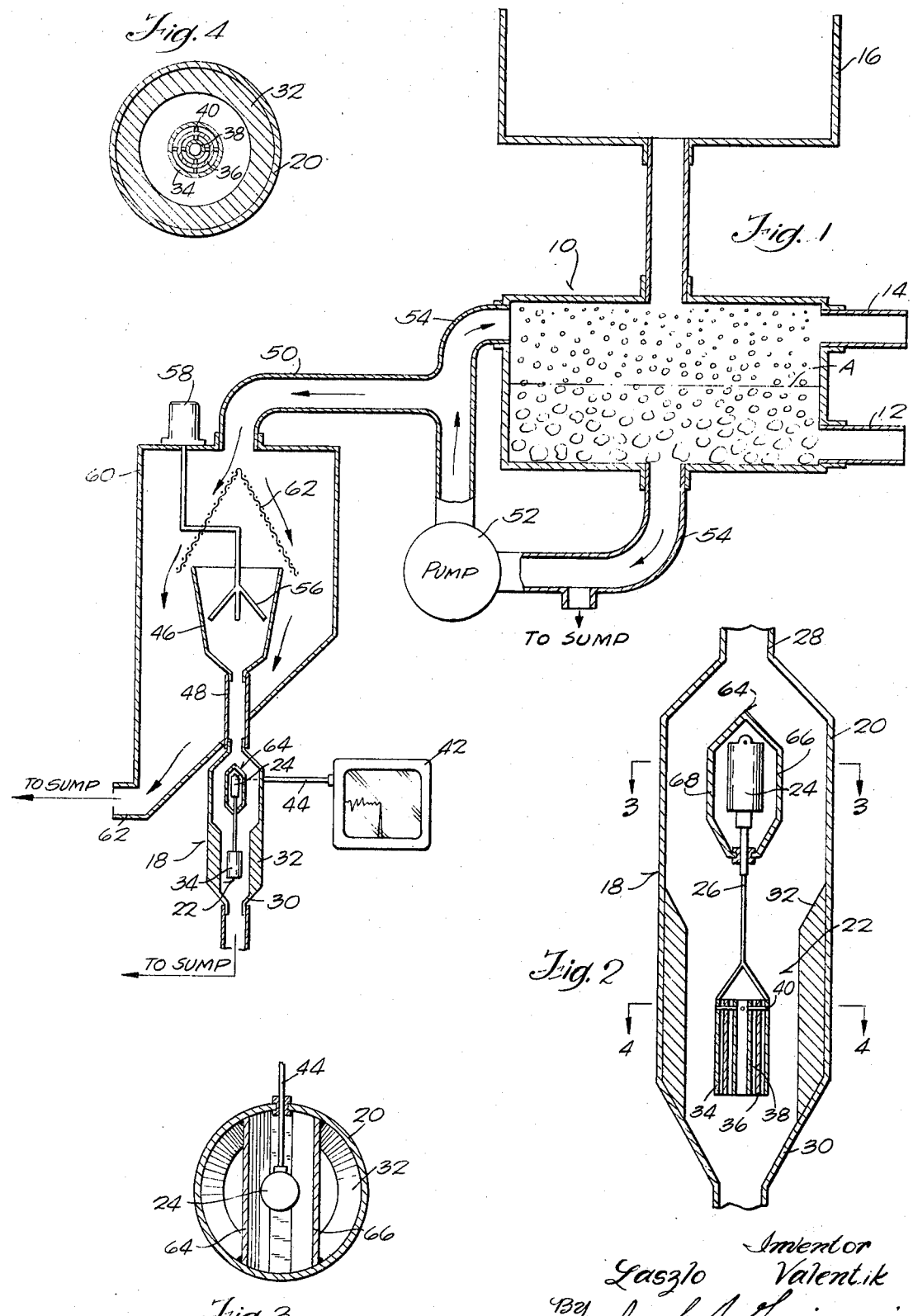

3,512,395
CONSISTOMETER
Laszlo Valentik, Houghton, Mich., assignor to Board of Control of Michigan Technological University, Houghton, Mich.
Filed Aug. 27, 1968, Ser. No. 755,671
Int. Cl. G01n 11/00
U.S. Cl. 73—54                                    19 Claims

ABSTRACT OF THE DISCLOSURE

A force-type consistometer capable of measuring the consistency or rheological properties of a process medium such as unstable heavy media suspensions encountered in dense medium separations includes a sensing unit having concentrically arranged, open-ended cylinders which are adapted to be positioned in a flow passage with the cylinders parallel to the direction of the flow through the passage. The cylinders are suspended from a transducing cell and subjected to continuous vertical flow in the passage. The viscous force exerted on the cylindrical tubes by the flow is converted by the transducing cell into an electrical signal which is used to generate a visible readout. The readout is a measure of the consistency of the flowing medium.

In one embodiment, the consistometer is used in connection with a separator and a portion of the process medium is drawn off from the separator and directed to the flow passage for flow through the cylinders. The pressure head of the medium in the separator maintains continuous flow through the cylinders and the conduit and cylinders are fed through an open-ended hopper which maintains a constant head on the cylinders.

BACKGROUND OF INVENTION

Field of invention

This invention relates to consistometers and, more particularly, to consistometers as used in connection with separation processes.

Description of prior art

A factor in achieving effective separation in many processes is the consistency of the medium in which separation is being carried out. For example in the process of producing aggregate for use in concrete for paving, heavier rocks, and particles in general, are preferred for the aggregate as they result in concrete which will more effectively resist bending and cracking as a result of environmental conditions such as freezing and thawing. Generally, a mixture of the raw aggregate, containing various size rocks, sand, etc., is introduced into a separator. The required consistency of the heavy media suspension (e.g. a mixture of water, clay, ferro-silicon, magnetite, etc.) for effective separation can be predetermined and is achieved and maintained in a conventional manner, e.g. with the use of conventional additives. Failure to maintain the proper consistency can adversely affect separation. If the consistency is not proper, the media solids will settle out and the required specific gravity of the suspension will not be maintained, in which event separation of aggregate will not take place. The predetermined consistency of the medium is maintained to insure a floating action of the lighter material so that the heavier material can separate out and will do so at an optimum rate.

It has been proposed to control consistency during the separation process but, heretofore, sensing arrangements have not been proposed which could continuously monitor consistency and thereby facilitate control or permit automated control. The previously accepted manner of checking consistency has been to periodically remove samples and test the samples in a laboratory. The necessary adjustment is then made to regulate the consistency as indicated by the tests. This procedure is relatively awkward, requires close attention by monitoring personnel and, due to the time lag between sampling and making the indicated adjustment, does not assure accurate or reliable separation results. This invention is concerned with this problem of effectively measuring consistency and particularly in a separation process.

SUMMARY OF INVENTION

Among the objects of this invention is to provide an arrangement which accurately, and in a reliable manner, affords a continuous measure of the consistency, or changes in consistency, of a particular fluid medium and to do so without the need for close attention by monitoring personnel and separate testing. For the achievement of this and other objects, this invention proposes an arrangement which senses, directly, in the flow of the medium being measured. The arrangement includes a plurality of sensing elements disposed in the flow with all of the sensing elements having an extension in a common direction, that being the direction of medium flow. Preferably, the sensing elements are relatively closely spaced and are generally parallel to each other and the direction of medium flow. The sensing elements are held in a relatively stationary position in the flow and as the medium flows past the sensing elements, a force is exerted on the elements. The consistency of the flowing medium is a factor in determining the magnitude of the force exerted on the sensing elements and hence the force affords a measure of the consistency of the medium. The sensing elements are connected to a transducing cell which is in turn connected to a suitable readout device, gauge, chart, etc., thereby affording a continuous readout indicative of consistency or changes in consistency.

In a preferred embodiment wherein the consistency of a medium carrying product to be separated is to be controlled, the sensing elements are supported in a flow passage and at least a portion of the medium is circulated through the passage. This provides a continuous readout of the consistency, or changes in consistency, of the medium. Preferably, the sensing elements and separator are arranged so that the head pressure in the separator maintains a continuous flow to the sensing elements and the medium is fed to the sensing elements in such a manner as to maintain a constant head of flow pressure on the sensing elements.

DESCRIPTION OF DRAWINGS

FIG. 1 is a schematic illustration of a consistometer arrangement in combination with a separator;

FIG. 2 is an enlarged view of the consistometer arrangement;

FIG. 3 is a section view along line 3—3 of FIG. 2; and

FIG. 4 is a top view of the sensing unit.

DESCRIPTION OF PREFERRED EMBODIMENT

The invention will be described as embodied in a consistometer used to monitor consistency of an unstable process medium. Specifically, it will be described in connection with a separation process used in the prdouction of aggregate for use in highway concrete. It will be appreciated, however, that the invention offers wide application in other heavy media process, e.g. coal and ore preparations, and also can be used in laboratory equipment to assist in determining the rheological properties of non-Newtonian suspensions.

A separator 10 has been illustrated schematically in the drawing as it can take any conventional form. For example, it can take the form of either a drum or cone type separator. Since these separators are conventional and well known they have not been illustrated in detail. The separation is illustrated schematically by line A with the relatively heavier fraction being below the line and the lighter fraction above the line. Some form of conventional agitation (not shown) is provided in the separator to maintain the media solids in suspension.

As stated above under "Background of Invention," the lighter rocks (the lighter fraction) are less desirable for use in the aggregate and thus must be separated from the desired heavier rocks (the heavier fraction). This separation is achieved in the separator with the heavier fraction being drawn off at outlet 12 and the lighter fraction being drawn off separately at outlet 14, again the inlet and outlet being illustrated schematically. A mixture of the heavy and light fraction, from feed 16, and a process medium are introduced into the separator. To insure effective separation the consistency of the medium in which the heavy and light fractions are suspended in the separator is controlled. If the consistency is not the required value, the media solids (ferrosilicon, magnetite etc.) will settle out and separation will not take place. It has been recognized that consistency should be controlled and maintained so as to insure a degree floating action of the lighter fraction but the problem has been to do so effectively and in a manner which is practical on a commercial basis. This invention solves this problem by providing an automatic and continuous measurement of consistency.

Consistometer assembly 18 is connected to the separator, description of the connection of the consistometer assembly to the separator will be deferred until after the structure and basic function of the consistometer has been described. Assembly 18 includes elongated conduit 20 and sensing unit 22 and transducing cell 24 arranged within the conduit and connected by wire 26. The conduit is circular in cross section and defines a flow passage the inlet to which is formed by an inverted funnel-shaped member 28. The passage outlet is formed by a similar funnel-shaped member 30. The conduit has a reduced cross section in the area of the sensing unit, the reduced cross section being provided by a cylindrical filler member 32.

The sensing unit is made up of three concentrically arranged open-ended cylinders 34, 36 and 38. These cylinders are interconnected by spider 40 and suspended from transducing cell 24 by wire 26. This arrangement provides a sensing unit having a number of relatively closely spaced confronting surfaces extending in the direction of flow through the conduit, preferably the surfaces are parallel to each other and to the direction of flow through the conduit as illustrated in the drawing. Flow in conduit 20 occurs over and through the cylinders and this exerts a force on the sensing unit which is transmitted by wire 26 to transducing cell 24 where the force on the sensing unit evidences itself as a stress on the transducing cell. The magnitude of force exerted on the sensing unit is dependent upon the consistency of flowing medium and hence the stress on the transducing cell also corresponds to that consistency.

The transducing cell can be any one of a number of conventional types which include an element, or mechanism, which responds to stress, or change in stress, and is capable of translating that stress, or change in stress, into an electrical signal. The details of the transducing cell are not necessary to an understanding of this invention and have not been illustrated and will not be described, it being kept in mind that the function of the transducing cell is to respond to the mechanical force on the sensing unit and translate that sensed condition into a signal useable in providing a visual readout. As one example, transducing cell 24 could comprise a conventional strain gauge.

As illustrated, the transducing cell is connected to a continuous charting device 42 of conventional construction, by leads 44. As the stress on the transducing cell varies, the signal from the cell varies and the charting devices provides a continuous graph of these variations thereby affording a continuing readout of the consistency of the medium flowing in conduit 20. Preferably, flow through conduit 20, and over the sensing unit, is under a generally constant pressure so that that factor is virtually through conduit 20, and over the sensing unit, is under a continuous measure of consistency, or variations in consistency, is provided so that the consistency of a medium is monitored by passing the medium through conduit 20.

In the illustrated process, at least a portion of the medium being processed in separator 10 is drawn off and passed through conduit 20. Structurally, the inlet of conduit 20 is connected to a funnel-shaped hopper 46 through a restricted neck 48. The upper end of the hopper is open and arranged below a connecting conduit 50 through which a portion of the process medium is directed from the separator to the hopper. A portion, a representative sample, of the process medium is drawn off from the separator and directed into hopper 46 through conduit 50. The hopper and consistometer can be positioned below the level of process medium in the separator as illustrated so that the head of pressure of the process medium in the separator maintains a continuous flow to the consistometer assembly without a pump. If desired a circulating system can be provided as illustrated, the circulating system including pump 52 and conduit 54 through which the pump draws process medium from the bottom of the separator and returns the fluid at the top of the separator. In this instance, conduit 50 is connected to conduit 54 and a portion, a representative sample, of the circulating medium is drawn off for passage through hopper 46 and consistometer assembly 18.

At this point, one of the advantages of using the open-ended hopper should be noted. The process medium will fill the hopper to its upper lip, any excess will overflow the hopper, this maintains a constant head on the sensing unit. Stirrer 56 is disposed in hopper 40 to agitate the fluid and insure uniformity and continuity of fluid flow to the sensing unit. The stirrer is suitably connected to drive motor 58. The stirrer also continuously agitates the process medium in the hopper to insure its containing a representative sample.

Hopper 46 is housed within an enclosure 60 which catches hopper overflow and returns it to the sump through conduit 62, only a portion of conduit 62 is shown in the drawing.

It is also desirable to place a screen 62 over the hopper inlet to separate from the process medium larger particles which may interfere with flow to and operation of the consistometer assembly and which are not a factor in the consistency of the medium in which the separation products are suspended and which is to be measured. The screen is preferably cone-shaped and the articles separated by the screen also fall into enclosure 60 and are returned to the sump through conduit 62.

Transducing cell 24 is preferably housed in a substantially sealed enclosure 64 which extends diametrically in conduit 20 (see FIG. 3) but has its sides 66 and 68 spaced from the inner conduit walls to accommodate flow. The upper end of enclosure 64 is generally cone-shaped to reduce resistance to flow and leads 44 which connect the transducing cell to chart 42 pass through conduit 20 at one of the ends of enclosure 64 so as to be protected from the flow. The cylinders are preferably made of stainless steel and wire 26 is also made of a corrosion resistant material so that the consistometer can handle very corrosive material such as magnetite and ferro-silica media.

Outlet 30 of conduit 20 is also suitably connected (not shown) to the sump so that the sample of the process medium passed through the sensing unit is also returned to the sump.

A conventional form of density regulation can be provided in the sump so that the mixture of the medium delivered to the separator for processing will have the necessary density characteristics. The heavy and light fractions are suspended in a medium having the necessary consistency to insure adequate separation. As separation proceeds, a portion of the process medium in the separator is drawn off from the separator and introduced into hopper 46. Hopper 46 is filled and maintains a constant head of pressure on consistometer assembly 18. The process medium in hopper 46 flows through neck 48 over enclosure 64 and through and over sensing unit 22. The flow exerts a force on the sensing unit and this force is transmitted through wire 26 to transducing cell 24. Transducing cell 24 controls chart 42 to provide a continuous readout of the consistency of the medium flowing in the consistometer assembly, this readout is in the form of a continuous graph. As variations in consistency in the process medium occur, these variations will be reflected in the sample drawn off and introduced into hopper 46 and passed over the sensing unit. The variations in consistency change the force exerted on the sensing unit and, correspondingly, vary the electrical output of the transducing cell. This different electrical signal is reflected in the graph drawn in chart 42. An operator periodically inspecting the graph can immediately determine any variation in consistency and can make the necessary adjustments in the sump, or directly in the separator, to maintain the desired consistency. The consistency can be varied in any conventional manner, for example by regulating the amount of water and/or consistency additives to the process medium.

The above-described arrangement provides a rugged, relatively low cost consistometer assembly which is adapted to continuously monitor the consistency of a flowing fluid and generally the rheological properties (plastic viscosity and yield stress for example) of fluid. It lends itself well to completely automating heavy media processes. The flow of medium through the consistometer is continuous thereby preventing settling out of the media solids and no additional devices are needed to hold them in suspension. Also, as illustrated, the flow is vertical through the consistometer and this also serves to maintain a homogeneous suspension. The consistometer measures automatically the apparent viscosity of the fluid at a constant shear rate and offers wide application for automation in heavy media processes, heretofore this has only been measured with precision laboratory equipment after taking samples from the process medium. Such procedures are costly, time consuming and generally unreliable due to the time lag which may occur between sampling and making the adjustment to the process medium and, for the most part, are impractical on a commercial basis. In addition to use in the heavy medium processes, the consistometer assembly of this invention could also be used in laboratory studies, for example in the study of the rheological properties of non-Newtonian stable or unstable suspensions.

Although but one embodiment of the present invention has been illustrated and described, it will be apparent to those skilled in the art that various changes and modifications may be made therein without departing from the spirit of the invention.

I claim:
1. An arrangement for measuring the consistency of a fluid medium and comprising, in combination,
 means defining a flow passage,
 a plurality of sensing elements disposed in said flow passage and including generally planar surfaces all having their planar extensions in a common direction and generally in the direction of flow through said passage,
 means for supporting said sensing elements in said passage and for holding said sensing elements against movement with flow through said passage so that flow in said passage exerts a uniform force on said elements through said generally planar surfaces and corresponding to the consistency of the fluid medium flowing in said passage, and
 transducer means connected to said sensing elements and operative to produce a signal corresponding to said force exerted on said sensing elements.

2. The arrangement of claim 1 wherein said sensing elements are arranged with said planar surfaces in confronting relationship and relatively parallel to each other and the portion of said passage in which said sensing elements are disposed.

3. The arrangement of claim 2 wherein said sensing elements comprise a plurality of concentrically arranged open-ended cylinders.

4. The arrangement of claim 2 wherein said sensing elements are arranged vertically and flow through conduit and said sensing elements are vertical.

5. An arrangement for measuring the consistency of a fluid medium and comprising, in combination,
 means defining a flow passage,
 transducer means disposed in said passage,
 a plurality of sensing elements disposed in said flow passage and all having an extension in a common direction and generally in the direction of flow through said passage,
 means for supporting said sensing elements in said passage downstream of said transducer means and for holding said sensing elements against movement with flow through said passage so that flow in said passage exerts a force on said elements corresponding to the consistency of the fluid flowing in said passage,
 means connecting said transducer means to said sensing elements such that said transducer means is strained in accordance with the force exerted on said sensing elements by flow past said sensing elements, and
 said transducer means responding to said strain and producing a signal in accordance with said strain.

6. The arrangement of claim 5 wherein said sensing elements comprise a plurality of concentrically arranged open-ended cylinders.

7. The arrangement of claim 6 wherein said transducer comprises a strain gauge, and including means defining an enclosure in said passage for said strain gauge to isolate said strain gauge from direct impingement thereon of fluid flowing in said passage.

8. In combination
a separator assembly wherein ingredients of a fluid mixture are separated,
an arrangement for measuring the consistency of a fluid medium and comprising
 means defining a flow passage,
 a plurality of sensing elements disposed in said flow passage, and all having an extension in a common direction and generally in the direction of flow through said passage,
 means for supporting said sensing elements in said passage and for holding said sensing elements against movement with flow through said passage so that flow in said passage exerts a force on said elements corresponding to the consistency of the fluid flowing in said passage,
 and transducer means connected to said sensing elements and operative to produce a signal corresponding to said force exerted on said sensing elements,
 and means connecting said passage to said separator assembly and operative to circulate at least a representative portion of said fluid mixture to said passage for flow past said sensing elements.

9. The arrangement of claim 8 wherein said sensing elements include confronting planar surfaces which are relatively parallel to each other and the portion of said passage in which said sensing elements are disposed.

10. The arrangement of claim 8 wherein
said transducer means is disposed in said passage,
said sensing elements are arranged in said passage downstream of said transducer means and the connection of said transducer means to said sensing elements is such that said transducer means is strained in accordance with flow past said sensing elements, and
said transducer means responding to said strain and producing a signal in accordance with said strain.

11. The arrangement of claim 10 wherein said sensing elements comprise a plurality of concentrically arranged cylinders.

12. The arrangement of claim 10 wherein said sensing elements are disposed vertically below the level of fluid mixture in said separator and the head of fluid mixture in said separator maintains continuous flow past said sensing elements.

13. The arrangement of claim 10 including an overflow hopper member upstream of and connected to said passage, said hopper member connected to said separator assembly and receiving and directing said representative portion into said passage with a constant head of pressure.

14. The arrangement of claim 13 including means in said hopper for stirring fluid disposed therein.

15. The arrangement of claim 13 including
means defining an enclosure surrounding said hopper for receiving hopper overflow,
screening means over the inlet to said hopper member for separating relatively large media contained in said fluid portion and directing said large media material into said enclosure.

16. In combination,
a separator,
means for introducing an unstable process medium into said separator including media held in suspension in accordance with the consistency of said process medium,
means defining a flow passage,
sensing means in said flow passage including a plurality of elements having generally planar surfaces generally parallel to the flow through said passage with said flow producing a viscous force on said surfaces so that said sensing means is responsive to the consistency of process medium flowing through said passage to generate a signal corresponding to said consistency, and
means for continuously drawing off at least a portion of the process medium being processed in said separator and for directing said portion through said passage over said sensing means element surfaces so that said sensing means continuously monitors the consistency of said process medium and produces a signal corresponding to that consistency thereby also providing continuous monitoring of suspension properties of said process medium in said separator.

17. The combination of claim 16 wherein said sensing means includes transducer means operative to generate said signal in accordance with a force exerted on said transducer means and also having said sensing elements in said flow connected to said transducer means for exerting a force on said transducer means in accordance with the consistency of the process medium flowing past said sensing elements.

18. In combination,
a separator,
means for introducing a process medium into said separator,
means defining a flow passage,
sensing means in said flow passage including a plurality of sensing elements in said flow having confronting surfaces arranged generally parallel to each other and the flow through said passage with said flow producing a viscous force on said surfaces in accordance with the consistency of the process medium flowing past said sensing elements, said sensing means also including transducer means connected to said sensing elements with said viscous force being transmitted to and stressing said transducer means, said transducer means operative to generate a signal in accordance with said stress, and
means for continuously drawing off at least a portion of the process medium being processed in said separator and for directing said portion through said passage over said sensing element surfaces so that said sensing means continuously monitors the consistency of said process medium and produces a signal corresponding to that consistency, and including an overflow hopper member operatively connected to said passage and separator and receiving said portion of said process medium from said separator and directing said portion of said process medium to said passage with a constant head pressure.

19. In combination,
a separator,
means for introducing a process medium into said separator,
means defining a flow passage,
sensing means in said flow passage including a plurality of sensing elements in said flow having confronting surfaces arranged generally parallel to each other and the flow through said passage with said flow producing a viscous force on said surfaces in accordance with the consistency of the process medium flowing past said sensing elements, said sensing means also including transducer means connected to said sensing elements with said viscous force being transmitted to and stressing said transducer means, said transducer means operative to generate a signal in accordance with said stress,
and means for continuously drawing off at least a portion of the process medium being processed in said separator and for directing said portion through said passage over said sensing element surfaces so that said sensing means continuously monitors the consistency of said process medium and produces a signal corresponding to that consistency,
and said sensing elements arranged vertically below the level of process medium in said separator and the head of process medium in said separator maintaining continuous flow past said sensing elements.

References Cited
UNITED STATES PATENTS

| | | | |
|---|---|---|---|
| 3,027,756 | 4/1962 | Head | 73—59 |
| 3,071,962 | 1/1963 | Perkins | 73—59 |
| 3,147,612 | 9/1964 | Evans | 73—59 |
| 3,163,172 | 12/1964 | Buzzard | 73—54 X |
| 3,402,729 | 9/1968 | Richmond et al. | 73—59 X |

S. CLEMENT SWISHER, Primary Examiner

J. W. ROSKOS, Assistant Examiner